United States Patent [19]

Patterson

[11] 4,256,528

[45] Mar. 17, 1981

[54] MACHINE FOR FORMING OPENINGS SEALED BY MANUALLY REMOVABLE LENGTHS OF TAPE IN CAN ENDS

[75] Inventor: Richard A. Patterson, Woodbury, Minn.

[73] Assignee: Minnesota Mining and Manufacturing Company, St. Paul, Minn.

[21] Appl. No.: 41,629

[22] Filed: May 23, 1979

[51] Int. Cl.³ .............................................. B32B 31/10

[52] U.S. Cl. .................................... 156/514; 156/566; 156/567; 156/569; 156/570; 414/36; 414/92; 414/93

[58] Field of Search ............... 156/513, 514, 556, 564, 156/566, 567, 569, 571, 573; 414/36, 92, 93

[56] References Cited

U.S. PATENT DOCUMENTS 3,029,176 4/1962 Schoonmaker ...................... 156/567

3,750,511 8/1973 Toensing ................................ 83/337

*Primary Examiner*—Caleb Weston

*Attorney, Agent, or Firm*—Cruzan Alexander; Donald M. Sell; William L. Huebsch

[57] ABSTRACT

A machine which forms openings in can ends and seals the openings with manually removable lengths of tape. The machine comprises a wheel and a plurality of plates having through passageways across which the can ends are supported. The plates are slidably mounted around the periphery of the wheel and are slid relative to the wheel between a first position at which punches carried by the wheel punch openings in the can ends when the wheel moves the plates along a first portion of the path, and a second position at which taping means mounted on a frame of the machine applies lengths of tape over the openings as the wheel moves the plates along a second portion of the path.

10 Claims, 11 Drawing Figures

MACHINE FOR FORMING OPENINGS SEALED BY MANUALLY REMOVABLE LENGTHS OF TAPE IN CAN ENDS

BACKGROUND OF THE INVENTION

This invention relates to continuous motion machines for forming openings in can ends and for sealing the openings by applying manually removable lengths of tape across the openings.

A known prior art machine of this type is the Scotch Tab I machine built by Remmele Engineering Company of St. Paul, Minn., the taping means for which is described in U.S. Pat. No. 3,750,511. That machine, like the invention described herein, includes transport means adapted for releasably engaging and moving a plurality of can ends seriatim along a predetermined path, feeding means for feeding can ends to the transport means at a beginning position along the path, opening forming means for forming openings in the can ends moving along the path, taping means mounted along the path for applying lengths of tape across the formed openings, and removing means for removing the completed can ends from the transport means.

In that machine, unlike the present invention, however, the transport means is a chain-like conveyor having can end locating fixtures attached thereto, with each fixture supporting a can end in a horizontal position on upwardly projecting pins. The connections between portions of the conveyor wear, thus causing the conveyor to elongate and the spacing between the can ends to increase so that the accuracy with which the opening forming means and the taping means engage the can ends is affected. Additionally the transport means lacks versatility in that it is difficult to change the locations at which the opening forming means and taping means form the sealed opening in the can end, such as from an edge to a central location. Also it is difficult to apply tape to both sides of the opening in the can end as may be desirable so that the inner tape will separate the contents of a can from the unplated severed edge of the opening and thereby prevent corrosion of that edge.

SUMMARY OF THE INVENTION

According to the present invention there is provided a machine of the type described above for forming openings sealed by manually openable tape closures in can ends, but which is less complex, less subject to wear that can affect the accuracy of placement of the sealed opening, more versatile, and can produce sealed can ends at a greater rate than the prior art machine described above.

Like the prior art machine, the machine according to the present invention includes transport means adapted for releasably engaging and moving a plurality of can ends seriatim along a predetermined path, feeding means for feeding can ends to the transport means at a beginning position along the path, opening forming means for forming openings in the can ends moving along the path, taping means mounted along the path for applying lengths of pressure sensitive tape across the formed openings, and removing means for removing the completed can ends from the transport means.

In the present invention, unlike that prior art machine, however, the transport means comprises a wheel rotatable about an axis, and a plurality of plates each including holding means adapted to releasably engage one of the can ends and being mounted around the periphery of the wheel for independent movement relative to the wheel between first and second positions. The opening forming means is positioned to engage the can ends in the plates when the plates are in their second positions; the taping means are positioned along the path to engage can ends in the plates when the plates are in their first positions; and the machine includes plate moving cam means for moving the plates to the appropriate positions so that can ends therein can be processed as they are engaged by the opening forming or taping means.

Preferably the plates are slidably mounted on the wheel for movement along a path parallel to the axis of the wheel; the opening forming means comprises a punch radially slidably mounted on the wheel adjacent each of the plates for movement between disengaged and engaged positions under the influence of punch cam means between the punch and frame of the machine to form an opening in a can end held in the adjacent plate when that plate is in its second position; and the taping means is fixed on the frame along the path to apply lengths of the tape over the openings formed in the can ends after the plates holding the can ends have been moved to their first position spaced from the adjacent punches.

With this arrangement the machine can be adapted to provide easy adjustability of the location at which the openings are formed and the tape is applied transverse of a can end by providing adjustable length cam linkages between the plate cam means and the plates. Also the machine may be easily adapted to receive a different sized can end by substituting different plates having holding means adapted for new sized can ends, which substitution is facilitated by a quick release coupling in the linkages between the plate cam means and the plates.

Additionally the machine preferably is adapted so that it can tape can ends on both sides. Each plate is formed with a through passageway, and the means for releasably engaging the can end in the plate positions the can end so that its opposite surfaces are accessible through opposite ends of the passageway. The means for applying tape includes tape applying mechanisms on both sides of the path for the plates which can both be used to simultaneously apply separate pieces of tape through opposite ends of the passageway.

The means on the machine for feeding can ends seriatim to the transport includes separating means for separating can ends from the bottom of a supply stack, plus means for transferring the separated can ends seriatim to the holding means in the plates on the wheel; whereas the removing means includes novel means for removing completed can ends seriatim from the plates on the wheel and for adding them to the bottom of a stack.

Also the machine can be adapted to apply particulate material to the adhesive coated area of the tape that spans the opening, which may be desirable when only one side of the can end is taped to prevent attraction of undesirable materials by the exposed adhesive. This function (which in the prior art machine was provided along the transport means after the tape was applied to the can end) is provided by dusting means along the tape path comprising a drum having a central cavity in which a source of particulate material is located, a cylindrical periphery to which the adhesive coated surface of the tape releasably adheres as the tape moves along the path, and spaced dusting orifices between the central cavity and the periphery through which particulate material may be propelled to predetermined portions of the tape that will cover the openings formed in can ends when the tape is applied.

BRIEF DESCRIPTION OF THE DRAWING

These and numerous additional advantages of the machine will be explained with reference to the accompanying drawing wherein like numbers refer to like parts throughout the several views, and wherein.

DESCRIPTION OF THE PREFERRED EMBODIMENT

Figure 1:
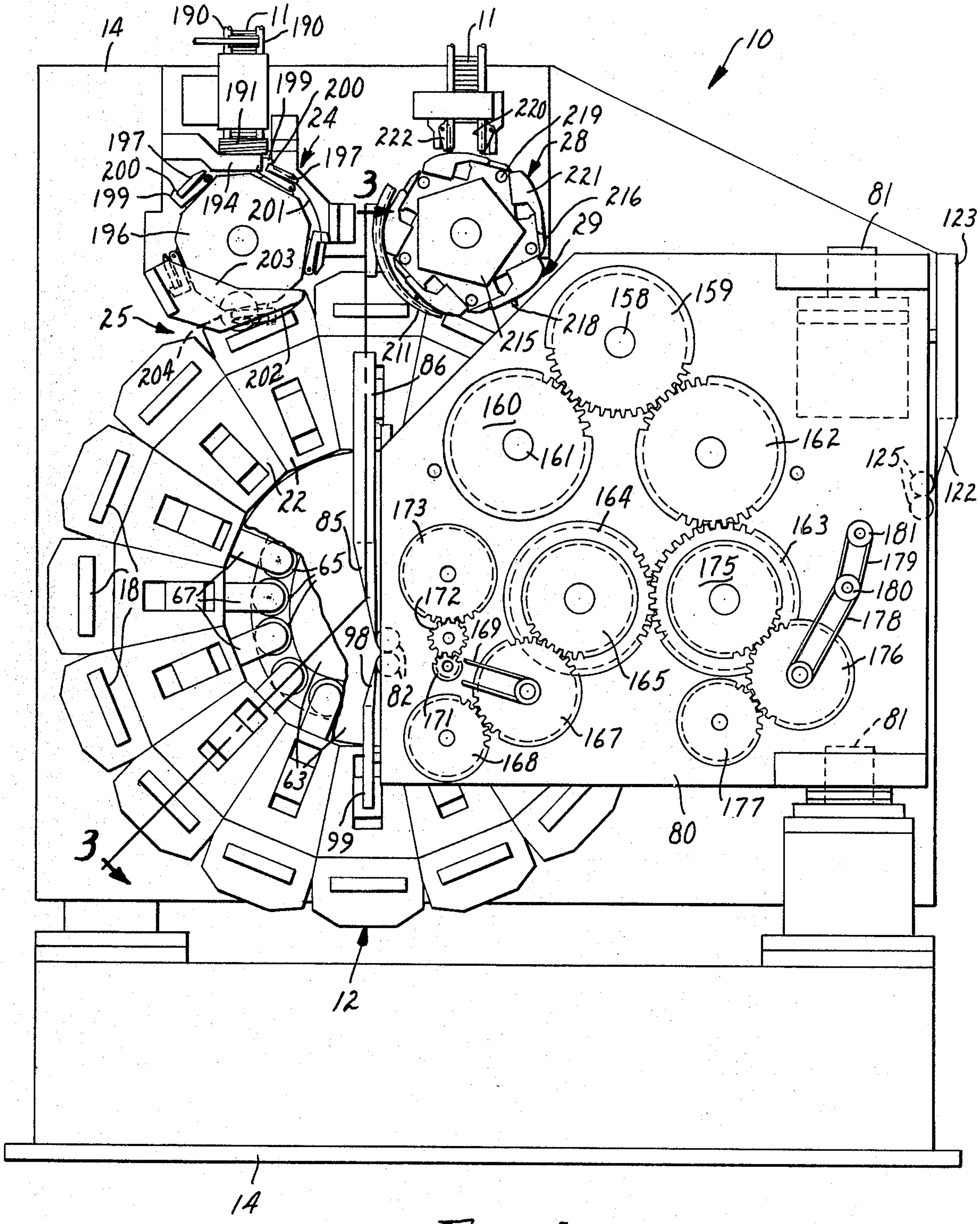
FIG. 1 is a vertical front view of a machine according to the present invention for forming openings sealed by manually removable lengths of tape in can ends.

Referring now to the drawing, there is illustrated a machine according to the present invention for forming openings sealed by manually removable lengths of tape in can ends, which machine is generally designated by the reference numeral 10.

Figure 3:
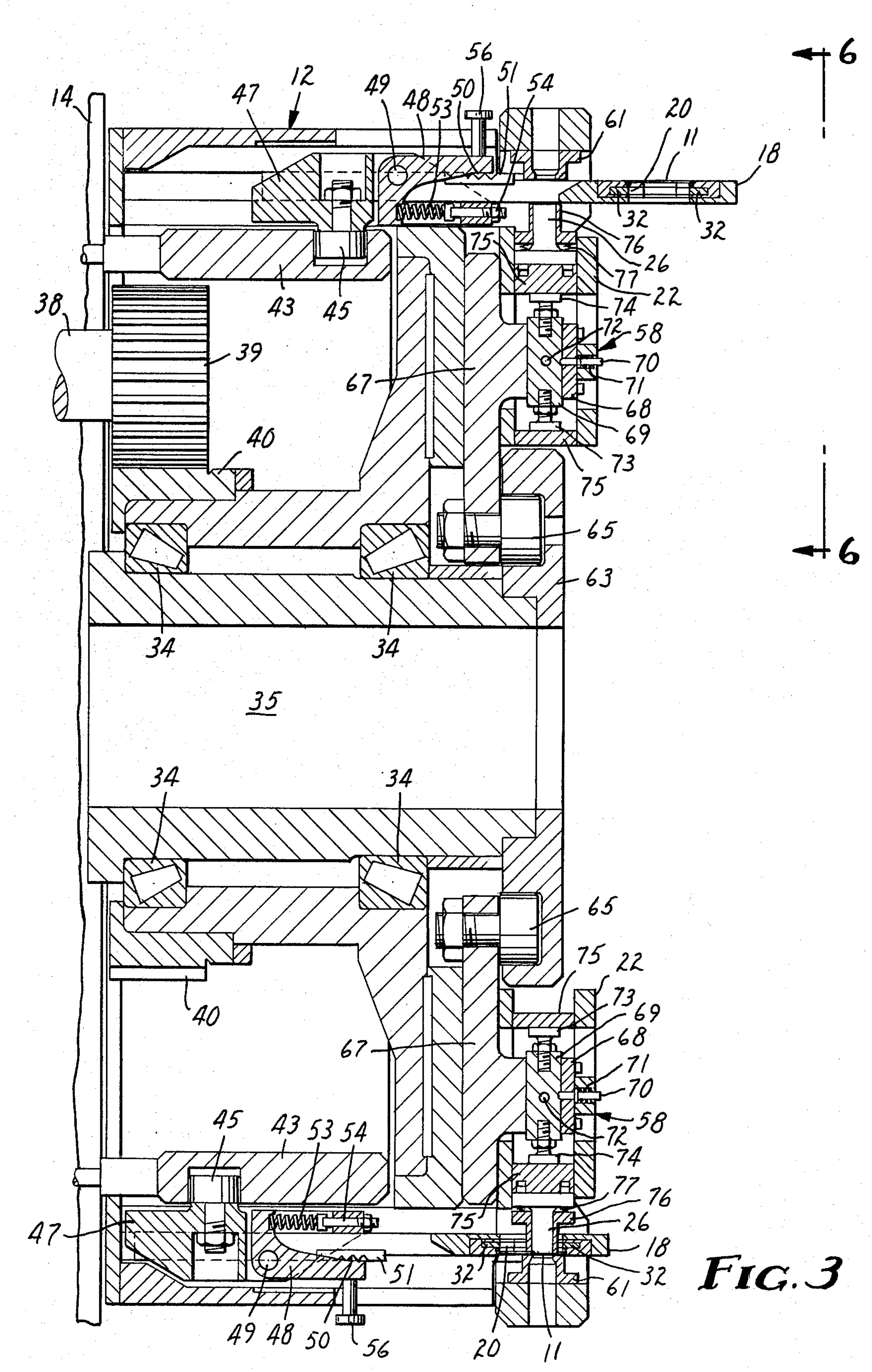
FIG. 3 is an enlarged sectional view taken approximately along lines 3—3 of FIG. 1.

Briefly, as is seen in FIG. 1, the machine 10 includes transport means for moving a plurality of can ends 11 seriatim along a predetermined path including a wheel 12 rotatably mounted on a frame 14 for the machine 10, and a plurality of identical elongate rectangular plates 18 independently movably mounted in the wheel 12 around its periphery. As is best seen in FIG. 3, each of the plates 18 includes magnetic means for releasably engaging and holding one can end 11 in a passageway 20 through the plate 18 so that the central portion of the can end 11 is accessible from both the inner and the outer surfaces of the plate 18 relative to the wheel 12, and is slidably mounted on the wheel 12 with its major surfaces parallel to the axis of the wheel 12 and bisected by a radius of the wheel 12 for movement axially with respect to the wheel 12 between (1) a first or outer position (top half of FIG. 3) with the portions of the plates 18 including the holding means projecting from a front surface 22 of the wheel 12, and (2) a second or inner position (bottom half of FIG. 3) with the portion of the plate 18 including the passageway 20 and holding means retracted within the wheel 12. Feeding means 24 (FIG. 1) are provided for delivering can ends 11 seriatim to the holding means in the plates 18 as the plates 18 in their outer positions relative to the wheel 12 pass a beginning position 25 along the path. During about the next half of the path, plate cam means moves the plates 18 to their inner positions, opening forming means including punches 26 (FIG. 3) carried by the wheel 12 form openings in the can ends 11, and the plate cam means then moves the plates 18 back to their outer positions. Subsequently the plates 18 are maintained in their outer positions by the plate cam means so that tape applying means 27 (FIG. 4) along the path can apply lengths of tape over the openings on one or both sides of the can ends 11, and the completed can ends 11 are removed from the plates 18 seriatim by removing means 28 (FIG. 1) as the plates 18 pass an end position 29 along the path.

The structure of the wheel 12, plates 18 and can end holding means are best seen in FIG. 3. The can end holding means includes walls in each of the plates 18 defining the passageway 20 which are stepped to provide a large diameter portion of the passageway 20 opening through the outer surface (relative to the wheel 12) of the plate 18 which will receive a can end from the feeding means 24, an annular surface mostly defined by magnetic members 32 set into the plate 18 which will magnetically hold a flange on a can end 11 in the passageway 20 against the annular surface and a smaller diameter portion of the passageway 20 opening through the inner surface of the plate 18 relative to the wheel 12, through which smaller diameter portion access may be had to the central portion of a can end 11 in the holding means.

The wheel 12 is mounted for rotation via spaced bearings 34 (FIG. 3) about a shaft 35 fixed to the frame 14 and is driven by a motor 36 (FIG. 2) through a gear box 37 via a shaft 38 (FIG. 3) carrying a pinion 39 engaging a ring gear 40 fixed to the wheel 12.

The plate cam means for moving the plates 18 between their inner and outer positions comprises a hollow cylindrical cam 43 (FIG. 3) fixed to the frame 14 and positioned around the inner portion of the wheel 12 concentric with the shaft 35. The cylindrical cam 43 has a groove around its outer periphery in which is positioned a different cylindrical follower 45 for each of the plates 18, which follower 45 is coupled to that plate 18 by a releasable adjustable length cam linkage. Each cam linkage comprises a main portion 47 on which the follower 45 is rotatably mounted which is slidably mounted on the wheel 12 for movement in the same direction as the plates 18, and a release arm 48 pivotably mounted on the main portion 47 at a pin 49. The release arm 48 has a V-shaped point 50 biased into engagement with a mating notch in a block 51 fixed to the slide 18 via a spring 53 between a second end of the arm 48 and a bolt 54 adjustably mounted on the main portion 47 of the cam linkage.

The cam linkage between each of the plates 18 and its cam follower 45 provides both a safety release if the plate 18 should jam, since the force of the spring 53 holding the point 50 in the block 51 will then be overcome allowing the arm 48 and the plate 18 to separate; and a means by which the plate 18 can be changed, which can be effected by manually pulling a knob 56 projecting from the end of the arm 48 opposite the point 50 through a slot in the periphery of the wheel 12 to disengage the point 50 from the notch in the block 51, after which the plate 18 can be pulled from the wheel 12, and a substitute plate can be inserted in the wheel 12.

Also, this cam linkage is adjustable to change the distance that the plates 18 project from and retract into the wheel 12 to thereby vary the position across a can end in the holding means that openings will be formed. Such adjustment is effected by changing the position at which the point 50 engages the block 51, either by causing the point so to engage a different notch in the block 51 or by changing the block 51 to provide a notch positioned in a different location.

Figure 6:
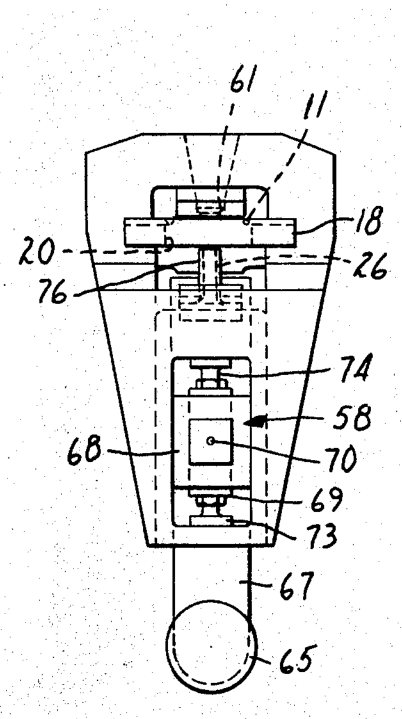
FIG. 6 is a fragmentary view taken along lines 6—6 of FIG. 3.

The opening forming means carried by the wheel 12, best seen in FIGS. 3 and 6, comprises a punch assembly 58 for each plate 18 mounted in the wheel 12 for radial sliding movement between (1) a disengaged position (FIG. 6 and the upper half of FIG. 3) at which one of the punches 26 which is included in the assembly 58 is spaced from the plate 18, and (2) an engaged position at which the punch 26 is engaged through an opening in a die 61 fixed on the wheel 12 (and thus through a can end 11 in the plate 18) when the plate 18 is in its inner position; and punch cam means for moving the punch assemblies 58 seriatim from their disengaged to their engaged positions and then back to their disengaged positions while their associated plates 18 are in their inner positions. Also included are means for limiting the pressure that may be applied by the punches 26 which restricts potential damage to the machine 10.

The punch cam means for moving each of the punch assemblies 58 between its disengaged and its engaged positions comprises a cam plate 63 fixed at the end of the fixed shaft 35, and having a groove around its inner surface in which is positioned a cylindrical follower 65. A releasable adjustable length punch linkage is coupled between the punch 26 and the follower 65 for each punch assembly 58. This linkage comprises a main portion 67 mounted on the wheel 12 for radial sliding movement, which main portion 67 includes a collar 68 defining a rectangular channel aligned radially of the wheel 12. A plunger 69 is slidably mounted in the channel, and is held at a predetermined position therein by a shear pin 72 which will transfer sufficient force to punch can ends, but will shear before it transfers sufficient force to damage the machine 10. An indicating pin 70 is slidably mounted in the collar 68 for movement in a direction generally normal to the center line of the channel and is biased by a spring 71 to engage its rounded innermost tip with a recess in the plunger 69. If the shear pin 72 shears, the plunger 69 will move in the channel, causing the end of the indicating pin 70 to move out of the opening in the plunger 69 against the bias of the spring 71 and provide an indication (which can be visually or mechanically-electrically detected) that the shear pin 72 has sheared. The plunger 69 has two oppositely outwardly projecting feet 73 and 74 at its ends, which feet 73 and 74 are adapted to engage the opposed inner end surfaces of an opening through a slide block 75 slidably mounted in the wheel 12. The slide block 75 has the punch 26 fixed at one end. The feet 73 and 74 are threaded into the plungers 69 and can be rotated to adjust the lengths of their portions that project from the plunger 69 to thereby adjust the disengaged and engaged positions of the punches 26 as may be necessary to compensate for machine tolerances or wear. The punch 26 carries a stripper sleeve 76 around its periphery biased by springs 77 to an outer position covering the distal end of the punch 26 to both hold the can end against the die 61 as it is engaged by the punch 26 and to promote clean separation of the punch 26 without bending the can end. The end of the die 61 is located closely adjacent the outer surface of a can end in the opening 20 when the punch 26 engages it.

Figure 4:
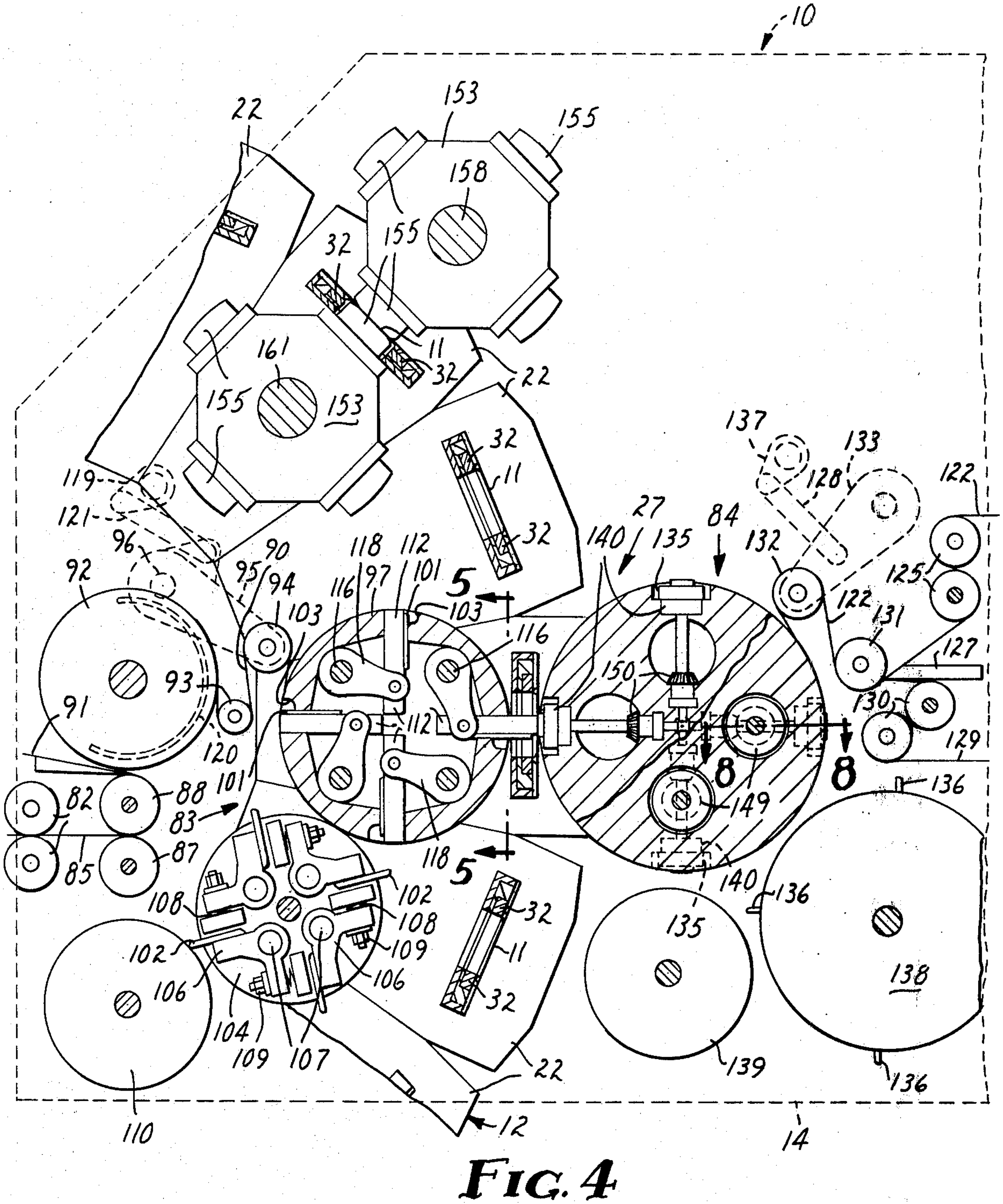
FIG. 4 is an enlarged fragmentary sectional view taken approximately along lines 4—4 of FIG. 2.

The tape applying means, seen in FIGS. 1, 4, 5, 8 and 9, includes a gear case 80 (FIG. 1) pivotably mounted on the frame 14 at trunnions 81 to afford pivotal movement of the gear case 80 from a normal tape applying position illustrated to a position spaced from the wheel 12 to facilitate servicing of the macine 10. As is best seen in FIG. 4, the tape applying means comprises two tape cutting and applying assemblies 83 and 84 with each assembly being mounted on a different side of the path. These assemblies 83 and 84 can be operated together to apply lengths of tape over both sides of openings formed in the can ends 11, or individually to apply lengths of tape over only one side.

The tape cutting and applying assembly 83 which applies lengths of tape to the outer surfaces of the can ends 11 (i.e., outer surfaces with respect to cans with which the ends 11 will eventually be joined, but inner surfaces with respect to the wheel 12) includes (1) means for defining a path for a closure tape 85 from a rotatably mounted supply roll 86 (FIG. 1) to the path for the can ends 11; (2) means (FIG. 4) along the tape path for cutting the tape 85 to a predetermined shape; (3) dusting means along the tape path which may (or may not) be used for depositing a particulate material (such as corn starch) over predetermined areas of the shaped tape which generally correspond to the opening in the can end covered by the tape (such particulate material is normally only applied when tape is not applied over the openings on the inner surfaces of the can ends, and restricts attraction of foreign objects to the exposed area of the tape across the opening which might otherwise occur during shipping or storage of the completed can ends); and (4) means for cutting predetermined portions from the shaped lengths of closure tape 85 and for applying those portions to can ends 11.

Figure 7:
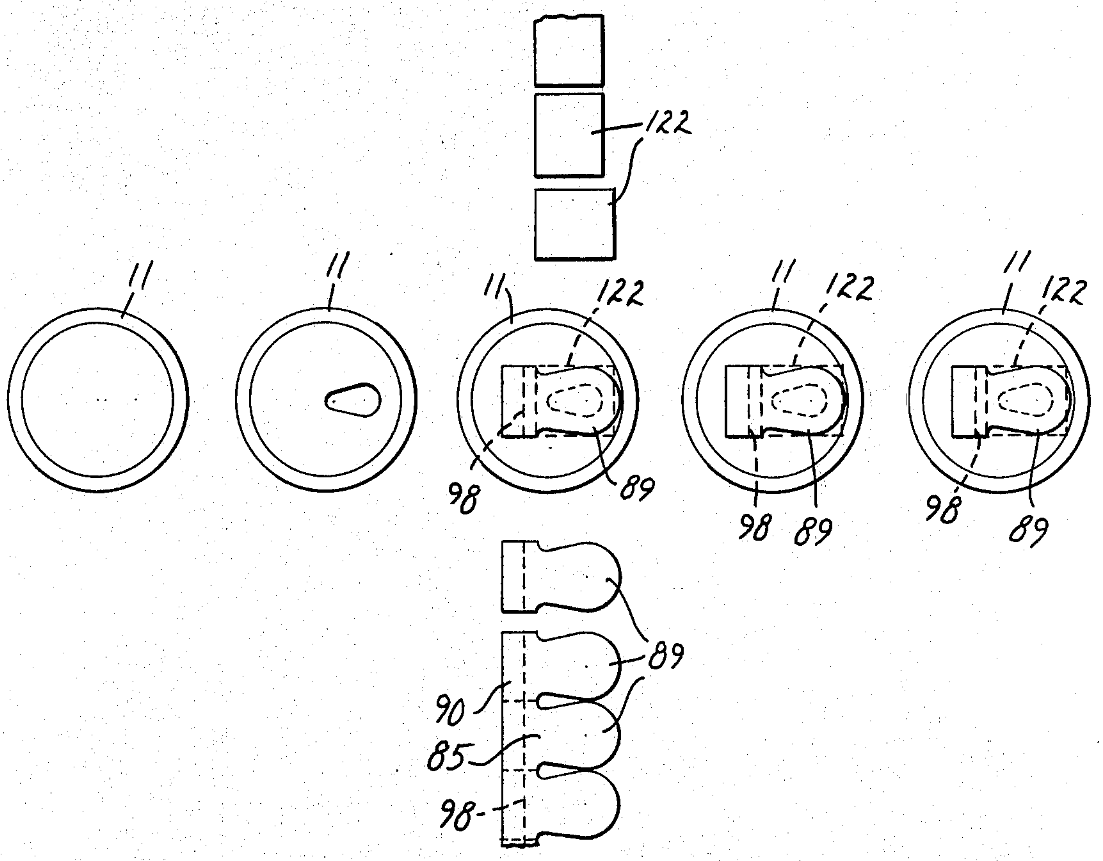
FIG. 7 is a schematic view showing the relationship between tape being applied and can ends to which the tape is applied in the machine of FIG. 1.

The means for defining a path for the closure tape 85 and for cutting the tape 85 to a predetermined shape includes a pair of knurling rollers 82 (the function of which will be explained later) and a pair of nipping cutting rollers 87 and 88. The roller 88 has a firm resilient supporting surface on which the non-adhesive coated surface of the closure tape 85 is supported, and the other roller 87 carries a continuous "Roto-die" around its periphery adapted to cut the closure tape 85 to produce a series of petal-like tape portions 89 (FIG. 7) projecting transverse of the closure tape 85 from a joined edge portion 90 of the closure tape 85. The portion or scrap 91 (FIG. 4) from the tape 85 which is cut away at the nipping rollers 87 and 88 is pulled away and discarded by a vacuum collector not illustrated, whereas the formed closure tape 85 passes around and in adhesive contact with the periphery of a drum 92 (which provides a part of the means for applying a particulate material later to be explained), around a roller 93 rotatably mounted on the gear case 80 and adjustable in its position so that the path length between the cutting rollers 87 and 88 and the cutting means can be adjusted to ensure that the cutting means cuts between the petal-like tape portions 89, around a roller 94 at the end of an advancing arm 95 pivotably mounted on the gear case 80 at a pin 96, and along the surface of a vacuum applicator wheel 97 which provides part of the cutting and applying means which will cut the formed closure tape 85 between the petal-like portions 89.

The means for defining a path for the closure tape 85 also provides means for defining a path for a pull tab strip 98 which is much narrower than the closure tape 85. The pull tab strip 98 is drawn from a supply roll 99

(FIG. 1) rotatably mounted on the gear case 80 and is guided along the tape path so that it will adhere to the adhesive surface of the closure tape 85 adjacent its edge that will provide its joined edge portion 90 after the closure tape 85 passes the cutting rollers 87 and 88. The covered edge portion 90 of the closure tape 85 cannot adhere to a can end when the closure tape 85 is applied thereto, and will provide a manually engageable tab which may be manually engaged to peel away the applied length of closure tape 85. The knurling rollers 82 are adjusted to knurl the pull tab strip 98 and adjacent portion of the closure tape 85 to improve the gripability of the tab.

The means for cutting the closure tape 85 between its petal-like portions 89 comprises four pair of blades 101 and 102 (FIG. 4) adapted to engage and sever the closure tape 85 along the surface of the vacuum wheel 97, and means including the roller 94 and arm 95 for causing the closure tape 85 to move at the same speed as the blades 101 and 102 as pairs of the blades 101 and 102 engage.

As is best seen in FIG. 4, the vacuum wheel 97 carries the four blades 101 in equally spaced relationship about its periphery, with each blade 101 having a trailing edge aligned axially of the vacuum wheel 97. The vacuum wheel 97 has a relieved area 103 adjacent the trailing edge of each of the blades 101. A cutting wheel 104 is rotatably mounted on the gear case 80 axially parallel with the vacuum wheel 97, and carries the four blades 102 which project radially from its periphery in spaced relationship and have cutting edges across their outer ends each flanked by two fingers projecting beyond the cutting edge. The cutting wheel 104 is driven in synchronism with the vacuum wheel 97 to bring pairs of the blades 101 and 102 on the wheels 97 and 104 sequentially together in the nip between them. As is seen in FIG. 4, the blades 102 on the cutting wheel 104 are each fixed to one leg of an L-shaped arm 106 pivotably mounted on the cutting wheel 104 about a pin 107 at its mid-point, and biased against a stop provided by a nut on a bolt 109 fixed to the cutting wheel 104 by a spring 108 compressed between the end of the arm 106 opposite the blade 102 and a block-like portion of the wheel 104. The drive means moves the vacuum and cutting wheels 97 and 104 in synchronization so that prior to engagement of the edges of a pair of the blades 101 and 102, the projecting fingers of the blade 102 will contact the edge of the blade 101, whereupon the blade 102 will be caused to pivot away from the nut around the pin 107 against the bias of the spring 108 to load the edges of the blades 101 and 102 together as they engage in scissors-like fashion to sever the closure tape 85 therebetween.

A soft sponge-like oil impregnated oiling wheel 110 is rotatably mounted adjacent the cutting wheel 104 and will be contacted by the ends of the blades 102 to lubricate them as the cutting wheel 104 rotates.

The closure tape 85 is held in place on the vacuum wheel 97 via a vacuum system (not shown) which communicates through a manifold 105 (FIG. 5) at the end of the vacuum wheel 97 and passageways in the vacuum wheel 97 leading to a plurality of openings 111 through the periphery of the vacuum wheel 97, thereby causing the closure tape 85 to be pressed against the periphery of the vacuum wheel 97 so that friction therebetween will tend to pull the closure tape 85 with the periphery of the vacuum wheel 97. Drive means for the machine 10 via an arm 119 (FIG. 4) rotated about a shaft at one end and a link 121 between the arm 119 and the advancing arm 95 pivots the advancing arm 95 to move the roller 94 alternatively toward and away from the nip between the wheels 97 and 104 and is timed to move the roller 94 toward that nip and thereby allow the closure tape 85 to move with the vacuum wheel 97 as pairs of the blades 101 and 102 engage; and the tape advancing means is adapted to advance just the length of closure tape 85 desired for use on the can ends between blade engagements, thereby causing a desired length of closure tape 85 to be severed from the supply length each time a pair of the blades 101 and 102 engage.

Figure 5:
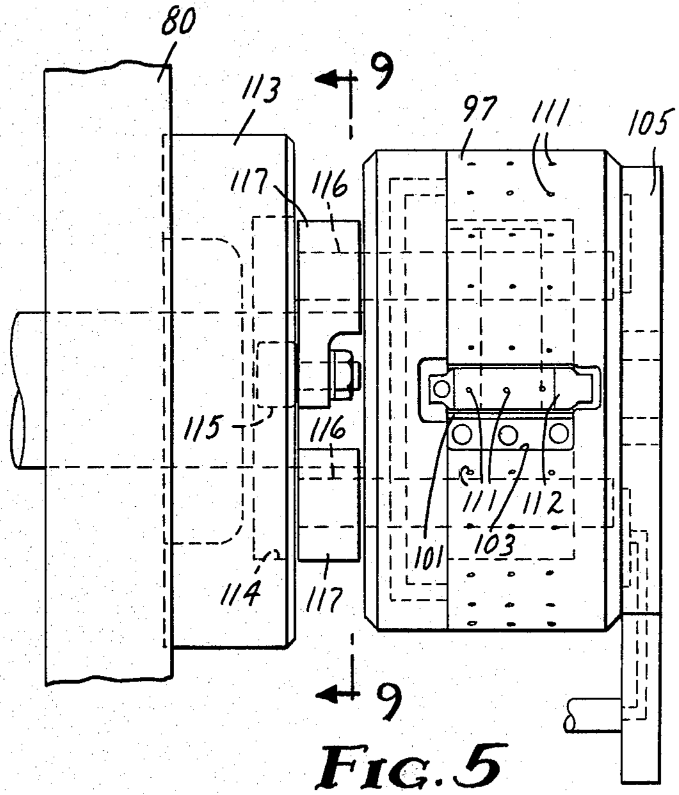
FIG. 5 is an enlarged fragmentary view taken approximately along lines 5—5 of FIG. 4.
Figure 9:
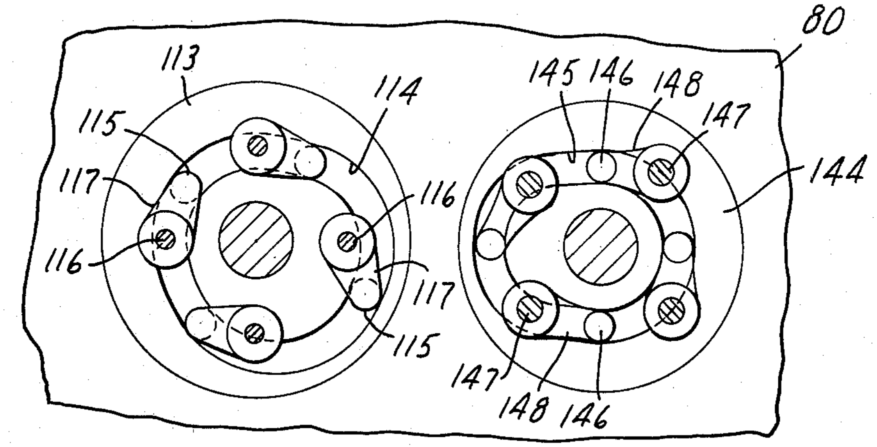
FIG. 9 is a combined sectional view taken approximately along lines 9—9 of FIGS. 5 and 8.

The means for applying the severed lengths of closure tape 85 comprises four plungers 112 mounted for radial sliding movement in the vacuum wheel 97, each having attached at its outer end a different one of the blades 101 in a position so that a length of closure tape 85 severed from the tape supply by one of the blades 101 will be positioned over the end of the adjacent plunger 112 to which that blade 101 is attached. The vacuum system communicates through openings 111 in the ends of the plungers 112 (FIG. 5) to hold the cut lengths of closure tape 85 in place, and cam means are provided to move the plungers 112 from retracted positions with their ends flush with the rest of the periphery of the vacuum wheel 97 when the tape is cut to extended positions to move the tape into the passageway 20 in the adjacent plate 18 and apply it to the can end 11 held therein when the plunger 112 moves adjacent the path for the can ends 11. This plunger cam means, which is illustrated in FIGS. 5 and 9, comprises a plate 113 fixed to the gear case 80 behind the vacuum wheel 97 and having a cam groove 114 in its outer surface, a rotatable follower 115 for each plunger 112 in the groove 114, and a linkage between the follower 115 and the plunger 112 comprising a pin 116 pivotably mounted on the vacuum wheel 97, an arm 117 between the inboard end of the pin 116 and the follower 115, and a link 118 (FIG. 4) on the outboard end of the pin 116 which has a dog at its end opposite the pin 116 in a transverse slot in the plunger 112 and adapted to move the plunger 112 between its retracted and extended positions as the arm 117 is pivoted by the movement of the follower 115 (FIG. 9) along the groove 114 in the cam plate 113.

The use of such a plunger 112 on the vacuum wheel 97 facilitates applying lengths of tape within the passageways 20 in the plates 18. Also, the smaller diameter of the vacuum wheel 97 afforded by the use of such plungers 112 results in a lower peripheral speed for the vacuum wheel 97 than would result if the vacuum wheel 97 had a diameter equivalent to that of the plungers 112 in their extended positions, thereby reducing the amount of sliding friction between the closure tape 85 and the periphery of the vacuum wheel 97 and the amount of resultant wear on the vacuum wheel 97.

The dusting means which can be used for depositing a particulate material over predetermined areas of the shaped closure tape 85 comprises a souce of particulate material, such as corn starch, located within a cavity in the drum 92 (FIG. 4). The drum 92 has a plurality of spaced orifices around its periphery, each in the shape of the predetermined area on the closure tape 85 to be coated with particulate material and spaced and located to apply the particulate material in the desired place on the peddle-like portions 89 of the closure tape 85 in adhesive contact with the outer surface of the drum 92. The orifices through the periphery of the drum 92 which are not covered by closure tape 85 along the tape path are covered by a fixed shield 120 within the drum 92 to prevent unwanted escape of the particulate material.

The tape cutting and applying assembly 84 for applying cut lengths of tape to the inner surface of the can ends 11 from the outer surfaces of the plates 18 includes (1) means for defining a path for a supply length of edge sealing tape 122 from a rotatably mounted supply roll 123 (FIG. 1) to the path for the can ends 11; (2) means along the path (FIG. 4) for cutting predetermined lengths from the end of the supply length of edge sealing tape 122; and (3) rotating means for rotating the cut lengths of the edge sealing tape 122 about 90 degrees before they are applied to the inner surfaces of the can ends 11.

The reason for rotating each cut length of the edge sealing tape 122 applied to the inner surface of the can ends 11 is as follows. When a cut length of the edge sealing tape 122 is applied to the inner surface of the can end 11 over the opening, the part of that tape 122 overlying the opening adheres to the portion of closure tape 85 on the outer surface of the can end 11 through the opening. When the outer closure tape 85 is then pulled away to open the can end 11, the part of the inner edge sealing tape 122 adhered thereto separates from the rest of the inner edge sealing tape 122 adhered around the opening and is removed with the outer closure tape 85 as it is pulled away to open the can end 11. The cleanness of separation of the inner edge sealing tape 122 along the edge of the opening in the can end 11 is effected for certain types of tape by the grain orientation of the edge sealing tape 122 on the inner surface of the can end 11. Thus the rotating means can rotate the edge sealing tape 122 to a more favorable grain orientation on the can end 11.

The means for defining the path for the supply of edge sealing tape 122 (FIG. 4) includes a pair of flanged guide rollers 125 which guide the edge sealing tape 122 through the nip therebetween. From the guide rollers 125 the edge sealing sealing tape 122 passes along a surface on a liner removal platen 127 having a sharp edge around which a liner 129 on the edge sealing tape 122 is removed and pulled away via a pair of driven nipping rollers 130. From the platen 127 the edge sealing tape 122 passes around an idler roller 131 and a roller 132 on an arm 133 to a vacuum wheel 134.

The means for cutting predetermined lengths from the supply length of edge sealing tape 122 comprises four pair of blades 135 and 136 (FIG. 4) adapted to engage and sever the edge sealing tape 122 along the surface of the vacuum wheel 134, and means including the roller 132 and the arm 133 which operate like the arm 95 and roller 94 and are driven by the machine drive means via a rotating arm 137 and link 128 to cause the tape 122 to move at the same speed as the blades 135 and 136 as pairs of the blades 135 and 136 engage.

As is best seen in FIG. 4, the vacuum wheel 134 carries the four blades 135 in equally spaced relationship about its periphery, with each blade 135 having a trailing edge aligned axially of the vacuum wheel 134 and being disposed adjacent a relieved area in the vacuum wheel 134 adjacent the trailing edge of each of the blades 135. A cutting wheel 138 is rotatably mounted on the gear case 80 axially parallel with the vacuum wheel 134, carries the four blades 136 which have the same structure and mounting system as the blades 102 on the wheel 104, and which blades 136 interact with the blades 135 to cut the edge sealing tape 122 in the manner that the blades 102 interact with the blades 102 to cut the closure tape 85. Also provided is an oiling wheel 139 like the oiling wheel 110 for oiling the blades 136.

Figure 8:
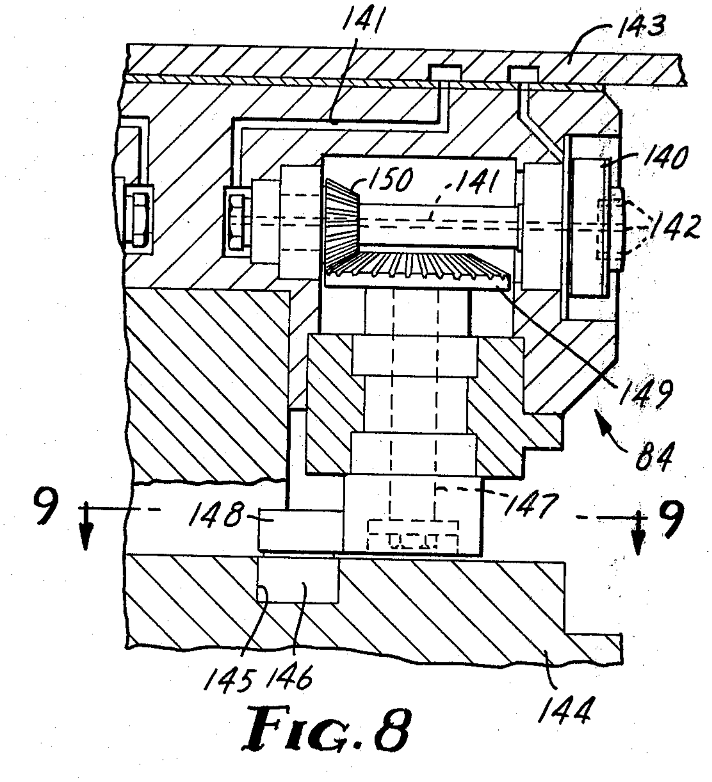
FIG. 8 is a fragmentary enlarged sectional view taken approximately along lines 8—8 of FIG. 4.
Figure 10:
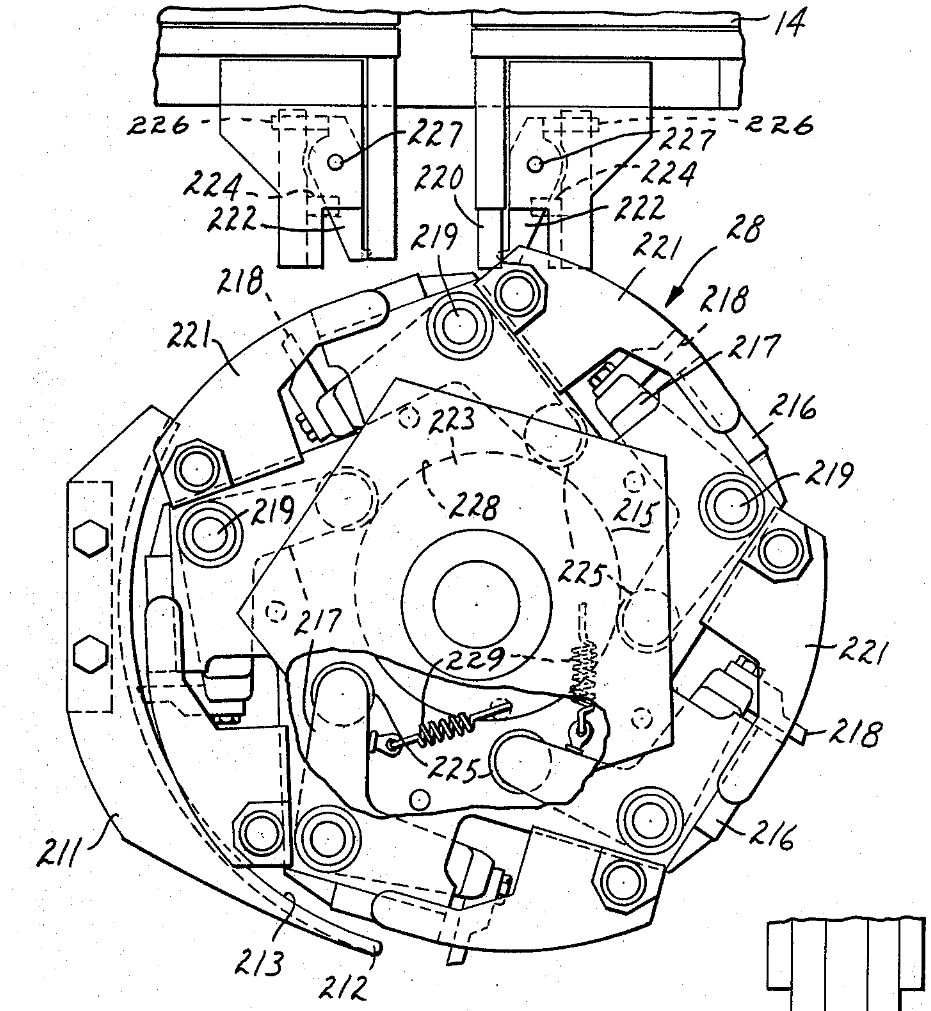
FIG. 10 is an enlarged fragmentary vertical front view of a mechanism for stacking completed can ends included in the machine of FIG. 1.
Figure 11:
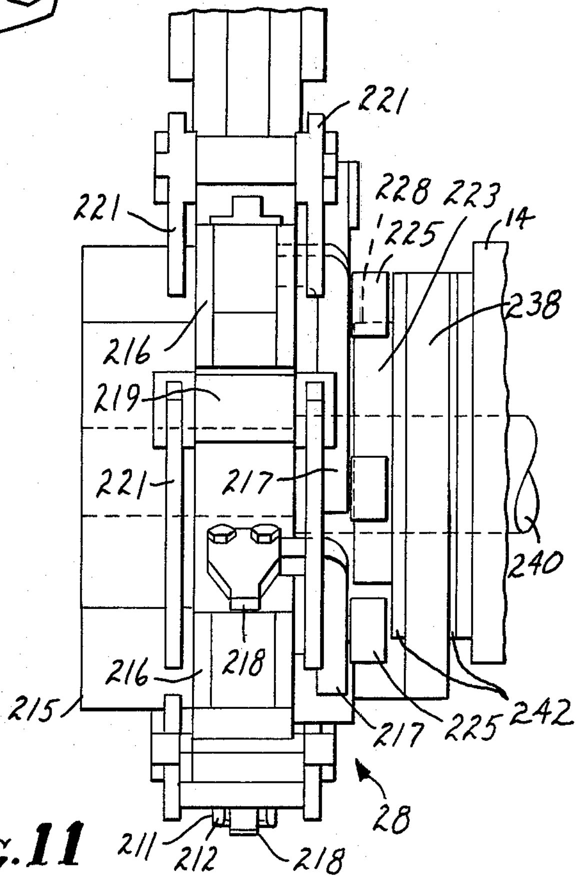
FIG. 11 is a fragmentary end view of the mechanism shown in FIG. 10.

The means for rotating and applying the severed lengths of edge sealing tape 122 comprises four stepped cylindrical members 140 (FIGS. 4 and 8) rotatably mounted in the vacuum wheel 134, each having attached at its outer end a different one of the blades 135 in a position so that a length of edge sealing tape 122 severed from the tape supply by one of the blades 135 will be positioned over the end of the member 130 to which that blade 101 is attached. The vacuum system (FIG. 8) communicates through a manifold 143 at the end of the vacuum wheel 134 passageways 141 in the vacuum wheel 134 and members 140 and openings 142 (FIG. 5) in the ends of the cylindrical members 140 to hold the cut lengths of edge sealing tape 122 in place, and cam driven means are provided to rotate the cylindrical members 140 from cut positions with the edges of the blades 135 aligned with the axis of the vacuum wheel 134 when the tape 122 is cut, to applying positions with the cut portions of the tape 122 rotated 90 degrees before it is applied to a can end 11 held by one of the plates 18 when the cylindrical member 140 moves adjacent the path for the can ends 11. This cam driven means, which is illustrated in FIGS. 4, 8 and 9, comprises a plate 144 (FIGS. 8 and 9) fixed to the gear case 80 behind the vacuum wheel 134 and having a cam groove 145 in its outer surface, a rotatable follower 146 for each member 140 in the groove 145, and a linkage between the follower 146 and the member 140 comprising a shaft 147 rotatably mounted on the vacuum wheel 134 parallel to its axis, an arm 148 between the outboard end of the shaft 147 and the follower 146 and a pair of bevel gears 149 and 150 between the shaft 147 and (FIG. 4) the members 140 for rotating the members 140 between their cut and their applying positions as the arms 148 are pivoted by the movement of the followers 146 (FIG. 9) along the groove 145 in the cam plate 144.

The tape applying means also includes a pair of tape pressing wheels 153 (FIG. 4) rotatably mounted on the gear case 80 on opposite sides of the path for the transport means. Each of the tape pressing wheels 153 includes four equally spaced radially extending projections including resiliently flexible tip portions 155 adapted to engage and be deflected against the adjacent side of the can end 11 in one of the plates 18 passing adjacent thereto. The drive means for the tape cutting and applying means includes means for rotating the tape pressing wheels 153 to move two of the tip portions 155 into the passageways 20 of each plate 18 passing between the tape pressing wheels 153, whereupon the tip portions 155 compress and apply a predetermined amount of pressure to firmly adhere the tape to the can ends 11. When the machine 10 is used to apply tape to both sides of a can end 11 these tip portions 155 are preferably conical in shape as illustrated, so that the initial pressure applied to the tapes is in the opening formed in the can end 11, and subsequent pressure will move outwardly from that point to sweep air completely from between the tapes, thereby insuring that the inner edge sealing tape 122 will adhere to the outer closure tape 85 across the opening and will be cleanly pulled away in the opening when the outer closure tape 85 is pulled away.

Figure 2:
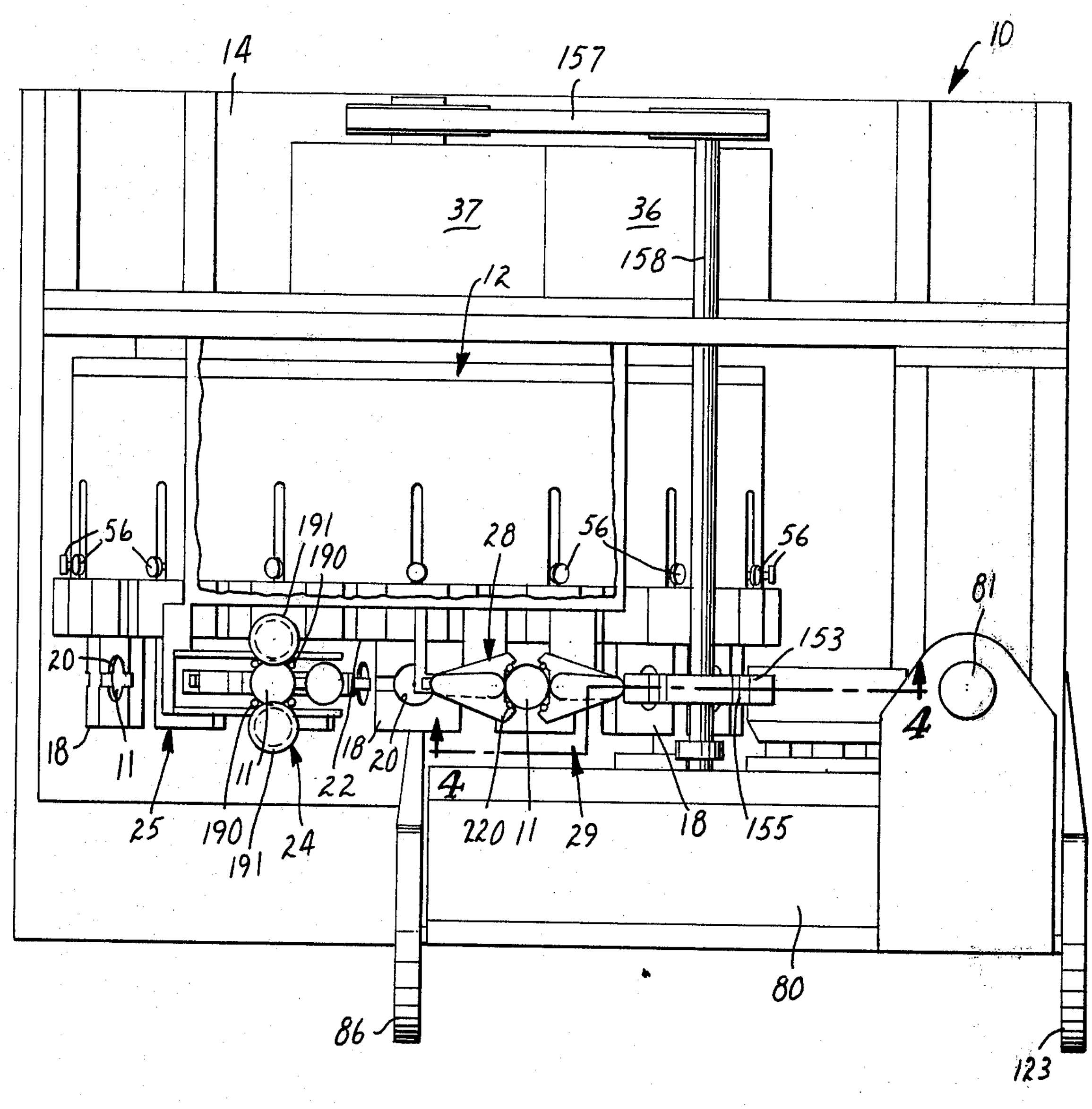
FIG. 2 is a top view of the machine of FIG. 1.

The drive means for the tape cutting and applying means is best seen in FIGS. 1, 2 and 4. The motor 36 (FIG. 2) via the gear box 37, a chain drive assembly 157 and a shaft 158 drives one of the tape pressing wheels 153, and a gear 159 (FIG. 1). The gear 159 drives a gear 160 and thereby a shaft 161 supporting the other tape pressing wheel 153 (FIG. 4); and drives an idler gear 162 and thereby gears 163 and 164 which drive the vacuum wheels 134 and 97 respectively. A smaller gear 165 fixed to the gear 164 via gears 167 and 168 drives the cutting wheel 104 and oiling wheel 110 respectively, and via gear 167 and a chain 169 drives engaged gears 171, 172 and 173 coupled respectively to the cutting rollers 87 and 88 and to the drum 92. Also by a smaller gear 175 fixed to the gear 163 a gear 176 fixed to the cutting wheel 138 is driven. The gear 176 in turn drives a gear 177 coupled to the oiling wheel 139; and via chains 178 and 179 a gear 180 fixed to one of the liner removal rollers 130 and a gear 181 fixed to one of the nipping rollers 125.

The feeding means 24 for feeding can ends 11 seriatim to the plates 18 at the beginning position 25 comprises a mechanism for supporting a vertical stack of the can ends 11, separating means for separating the bottom can end 11 from the stack, and means between the separating means and the beginning position 25 for engaging a can end 11 separated by the separating means, and for transferring the can end 11 to the holding means in the plate 18 at the beginning position 25.

The mechanism for supporting a stack of the can ends 11 and the means for separating the bottom can end 11 from the stack, best seen in FIGS. 1 and 2, comprise vertical rods 190 spaced around the periphery of the stack to maintain the vertical orientation of the stack, and a pair of spaced separating screws 191 which have vertical axes and helical grooves around their periphery, and which support the stack of can ends 11 on their upper surfaces. Rotation of the separating screws 191 via the drive means will cause the lowermost can end 11 to enter the helical grooves in the screws 190, to be separated from the bottom of the stack, and subsequently to exit the grooves at the lowermost edge of the separating screws where it will be supported on the bifurcated end portion 194 of a fork-like member fixed to the frame 14.

The means for transferring the separated can ends 11 to one of the plates 18 at the beginning position 25 comprises a transfer wheel 196 rotatably mounted on the frame 14 having a plurality of post-like radial projections 197 spaced around its periphery, each of which projections 197 includes a magnet having a field intensity which is significantly less than that of the magnetic members 32 that hold the can ends 11 in the plates 18. A hook-like member 199 is pivotably mounted on the wheel 196 adjacent each of the projections 197 and is spring biased so that a lip 200 on the hook-like member 199 will engage the edge of a separated can end 11 on the end portion 194 and pull it off of the end portion 194 and along the adjacent arcuate surface 201 of a shoe shaped to move the can end 11 into the field of the magnet on the adjacent projection 197. The magnet on that projection 197 then carries the can end 11 past the end of the shoe surface 201 and along the arcuate surfaces 202 of separators 203 fixed to the frame 14 which cam the can end 11 away from the projection 197 and deposit the can end 11 in one of the plates 18 where it is preferentially engaged by the magnetic members 32. Secure seating of the can end in that plate 18 is facilitated by a pair of weighted vertically moveable wheels 204 which roll over the can end being positioned in the plate 18.

The novel removing means 28 for removing the punched and taped can ends 11 at the end position 29 along the path for the can ends 11 is best seen in FIGS. 1, 2, 10 and 11.

The removing means 28 is a mechanism for transporting the disk-like can end 11 supported in the holders or plates 18 moving seriatim along the path defined by the wheel 12 to the bottom of a stack of can ends 11. The mechanism comprises a shoe 211 fixed relative to the frame 14 along the path, which shoe 211 has a pointed end portion 212 with an arcuate surface 213 along one side and is positioned so that as each of the plates 18 passes the shoe 211 the shoe 211 will be positioned in a transverse groove in the plate 18 with its pointed end portion 212 between the plate 18 and the can ends 11 to separate the can end 11 from the plate 18 and position the separate can ends 11 along the arcuate surface 213 of the shoe 211. Also included is a transfer wheel 215 rotatably mounted adjacent the shoe 211, which wheel 215 includes a plurality of radially projecting support members 216 with distal surfaces adapted to support the can ends 11. For each of the support members 216 there is provided a hook 218 adapted to engage the edge of the can ends 11, which hook 218 is mounted on one end of an L-shaped arm 217 pivotably mounted on the wheel 215 about a pin 219 for movement between (1) an engaged position at which the hook 218 can enter the groove and engage the edge of a can end 11 in one of the plates 18, and (2) a disengaged position spaced from the edge of a can end 11 supported on the adjacent support member 216. Means is provided for positioning the hook 218 in its engage position and for driving the wheel 215 in synchronism with the plates 18 moving along the path to engage the hook 218 with the can end 11 in one of the plates 18 and slide the engaged can end 11 along the arcuate surface 213 next to the adjacent support member 216. Means comprising a magnet in each of the support members 216 is provided for releasably holding one of the can ends 11 slid along the arcuate surface 213 against the adjacent support member 216.

A stop member 220 is fixed to the frame 14 adjacent the wheel 215 beneath the stack of completed can ends 11 and is adapted to engage the leading edge of one of the can ends 11 held on one of the support members 216 with the engaged can end 11 aligned with the stack of completed can ends 11. Means is provided for moving the hook 218 to its disengaged position with respect to one of the can ends 11 held against the adjacent support member 216 prior to engagement of that can end 11 with the stop member 220 so that the can end 11 can stop against the stop member 220 and slide along the support member 216. After the can end 11 is stopped by the stop member 220, cam means comprising spaced cam plates 221 carried by the wheel 215 adjacent each support member 216 move under the stopped can end 11 and push it into the bottom of the stack of can ends 11 between beveled sides of opposed hook-like ends on a pair of retaining lugs 222 pivotably mounted at pins 227 on the frame 14, and biased together against stops 226 by compression springs 224 between the retaining lugs 222 and the frame 14, which lugs 222 will retain the can ends 11 in the stack between vertical rods.

The means for moving each of the hooks 218 between its engaged and disengaged positions at the proper time during rotation of the wheel 215 comprises a cam plate 223 fixed to the frame 14 behind the transfer wheel 215 (FIGS. 10 and 11), and a follower 225 rotatably mounted on the end of the L-shaped arm 217 opposite the hook 218, which follower 225 can engage a surface 228 of the cam plate 223; and means comprising springs 229 between the arms 217 and the wheel 215 for biasing the hooks 218 toward their engage positions (defining by engagement of the arms 217 with the support members 216). As the wheel 215 is rotated the hooks 218 sequentially are moved from their engage positions to engage can ends 11 in the plates 18 passing the wheel 175 to their disengaged position in opposition to the springs 229 to separate the hooks 218 from the can ends 11 after the can ends 11 have been positioned on the support members 216 by the arcuate surface 213 by engagement of the followers 225 with the cam surface 228 so that the can ends 11 can be stopped against the stop member 220 and pushed into the stack of completed can ends 11 by the cam plates 221.

The removing means 28 also includes means for insuring that the shoe 211 will not be damaged if one of the passing plates 18 is not properly aligned, as could be the case if the point 50 became dislocated from the block 51 for one of the plates 18. The shoe is supported from a disk 238 pivitably mounted about a shaft 240 driving the wheel 215, and is held in its normal position by friction pads 242 pressed against the sides of the disk 238 and fixed relative to the frame 14. In the event of contact between a plate 18 and the shoe 211, the shoe 211 and disk 238 will be pivoted around the shaft 240 between the friction pads 242 and held away from successive plates 18 by the pads 242.

I claim:

1. In a machine comprising:

a frame;

transport means mounted on said frame adapted for releasably engaging and moving a plurality of can ends seriatim along a predetermined path;

feeding means adapted for feeding can ends seriatim to said transport means at a beginning position along said path;

opening forming means adapted for forming openings in said can ends moving along said path;

taping means mounted along said path for applying lengths of pressure sensitive adhesive tape across said openings; and removing means for removing can ends from said transport means at an ending position along said path;

the improvement wherein:

said transport means comprises:

a wheel rotatably mounted on said frame;

a plurality of plates each mounted on said wheel for independent movement transverse of said path between a first position and a second position;

holding means on each of said plates adapted to releasably engage a can end; and plate cam means for moving said plates to said first positions during movement of said plates along a first portion of said path, and for moving said plates to said second positions during movement of said plates along a second portion of said path;

said opening forming means are positioned to engage can ends in said plates when said plates are in their first positions; and said taping means are positioned along said second portion of the path to engage can ends in said plates when said plates are in their second positions.

2. A machine according to claim 1 wherein said plates are slidably mounted on said wheel for movement along a path parallel to the axis of said wheel.

3. A machine according to claim 1 or claim 2 wherein said opening forming means comprises a punch assembly slidably mounted on said wheel adjacent each of said plates for movement between a disengaged position spaced from the plate and an engaged position adapted to engage through a said can end in the plate when the plate is in its first position, and punch cam means between said frame and the punch assemblies for moving the punch assemblies seriatim from said disengaged to said engaged position and back to said disengaged position when said adjacent plates are in their first positions along the first portion of said path.

4. A machine according to claim 1 wherein said plates each have a through passageway, said means for releasably engaging on each plate positions an engaged can end with its opposite surfaces accessible through opposite ends of said through passageway, and said taping means includes means for applying a predetermined length of tape over said opening on both sides of said can end through the opposite ends of said passageway.

5. A machine according to claim 1, wherein said feeding and removing means comprises means for supporting a supply stack of can ends to be processed by said machine and a stack of completed can ends already processed by the machine with said stacks extending in a direction generally transverse of said path; separating means for separating one can end from said supply stack; means between said separating means and said beginning position along said path for engaging a can end separated by said separating means and for transferring the can end to said holding means at said beginning position; and means between said end position and said completed stack for removing a can end from said transport means and for adding said can end to the bottom of said stack of completed can ends.

6. A machine according to claim 1 wherein said taping means comprises a tape applying station, means for guiding a length of tape along a tape path to said tape applying station, and dusting means along said tape path for depositing a particulate material on a predetermined portion of the adhesive coating of said tape.

7. A machine according to claim 6 wherein said dusting means comprises a drum having a central cavity, a cylindrical periphery adapted for releasable adhesion with said tape, and having orifices between said periphery and the central cavity of said drum; means for rotatably mounting said drum on said frame with its periphery supporting the adhesive surface of tape along said tape path; and means within said central cavity for propelling particulate material against said tape through said orifices.

8. A machine according to claim 4 wherein said taping means further includes a pair of tape pressing wheels rotatably mounted on said frame on opposite sides of said path, said tape pressing wheels including radial projections with resiliently flexible tip portions adapted to engage the opposite surfaces of can ends through opposite ends of said passageways, and means for rotating said tape pressing wheels to move said tip portions into said passageways in the plates on opposite sides of can ends therein upon movement of the plates between said tape pressing wheels, said tip portions being shaped to compress and apply predetermined amounts of pressure on the tapes on opposite sides of the can ends.

9. A machine according to claim 8 wherein said tip portions are generally conical in shape, with the apexes of said conical portions being adapted to engage generally the centers of the lengths of tape extending across openings in said can ends so that subsequent compression of said tip portions will press air outwardly from between said lengths of tape.

10. A machine according to claim 1 wherein said removing means comprises a shoe fixed along said path, said shoe having a pointed end portion with an arcuate surface along one side and being positioned so that the pointed end portion will separate the can ends from the plates with the can ends disposed along said arcuate surface;

a wheel rotatably mounted adjacent said shoe, said wheel having a support member adapted to support a said can end;

a hook adapted to engage the edge of a said can end, said hook being mounted at one edge of said support member for movement between an engage position at which said hook can engage the edge of a said can end in one of said plates, and a disengaged position spaced from the edge of a said can end supported on said support member;

means for positioning said hook in its engage position and for driving said wheel in synchronism with said plates to engage said hook with said can end in one of said plates and slide said engaged can end along said arcuate surface adjacent said support member;

means adapted for releasably holding said can end slid along said arcuate surface against said support member;

a stop fixed adjacent said wheel and adapted to engage the leading edge of said can end held on said support member with the can end aligned with said stack;

means for moving said hook to its disengaged position with respect to said can end held against said support member prior to engagement of said can end with said stop; and cam means carried by said wheel for moving a said can end stopped against said stop into said stack.

* * * * *